Dec. 28, 1965  R. L. GATES  3,225,452
MEANS AND METHOD FOR GYROCOMPASS ALIGNMENT
Filed April 30, 1962  2 Sheets-Sheet 1
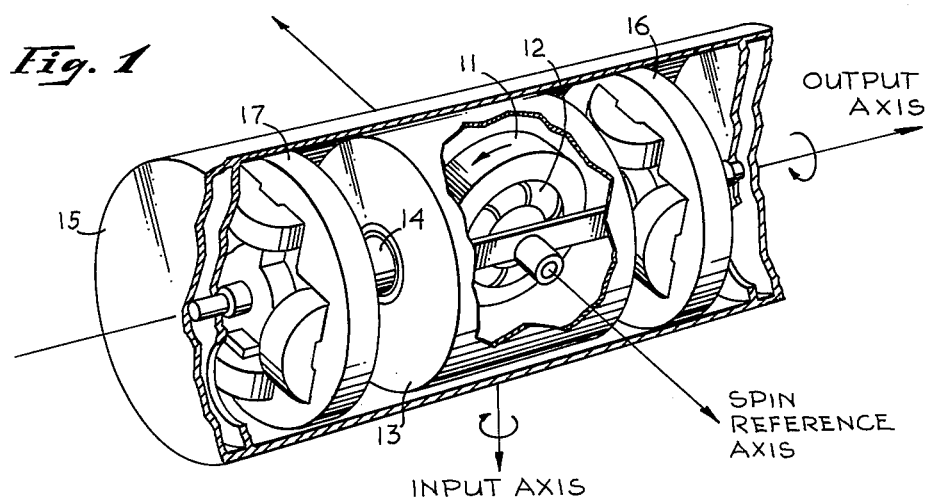
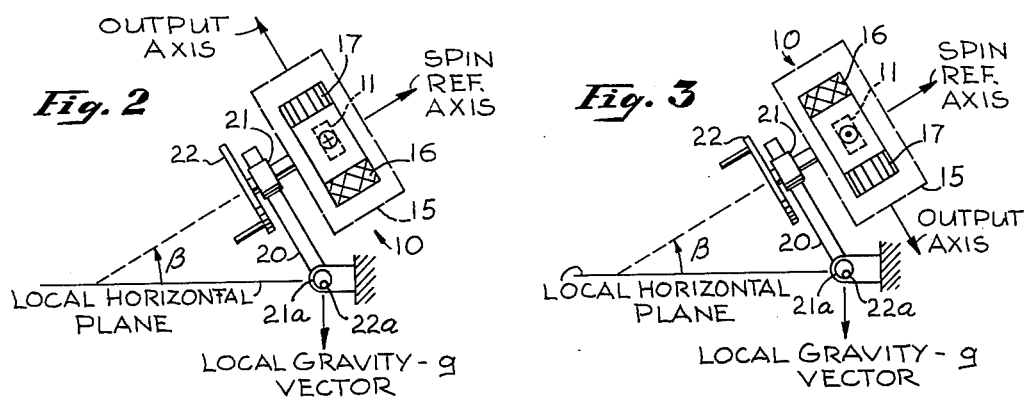
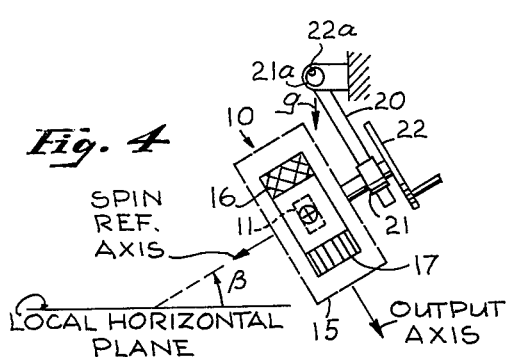
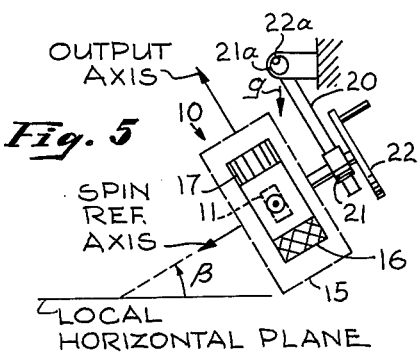
INVENTOR.
ROBERT L. GATES
BY
AGENTS Dec. 28, 1965    R. L. GATES    3,225,452
MEANS AND METHOD FOR GYROCOMPASS ALIGNMENT
Filed April 30, 1962    2 Sheets-Sheet 2
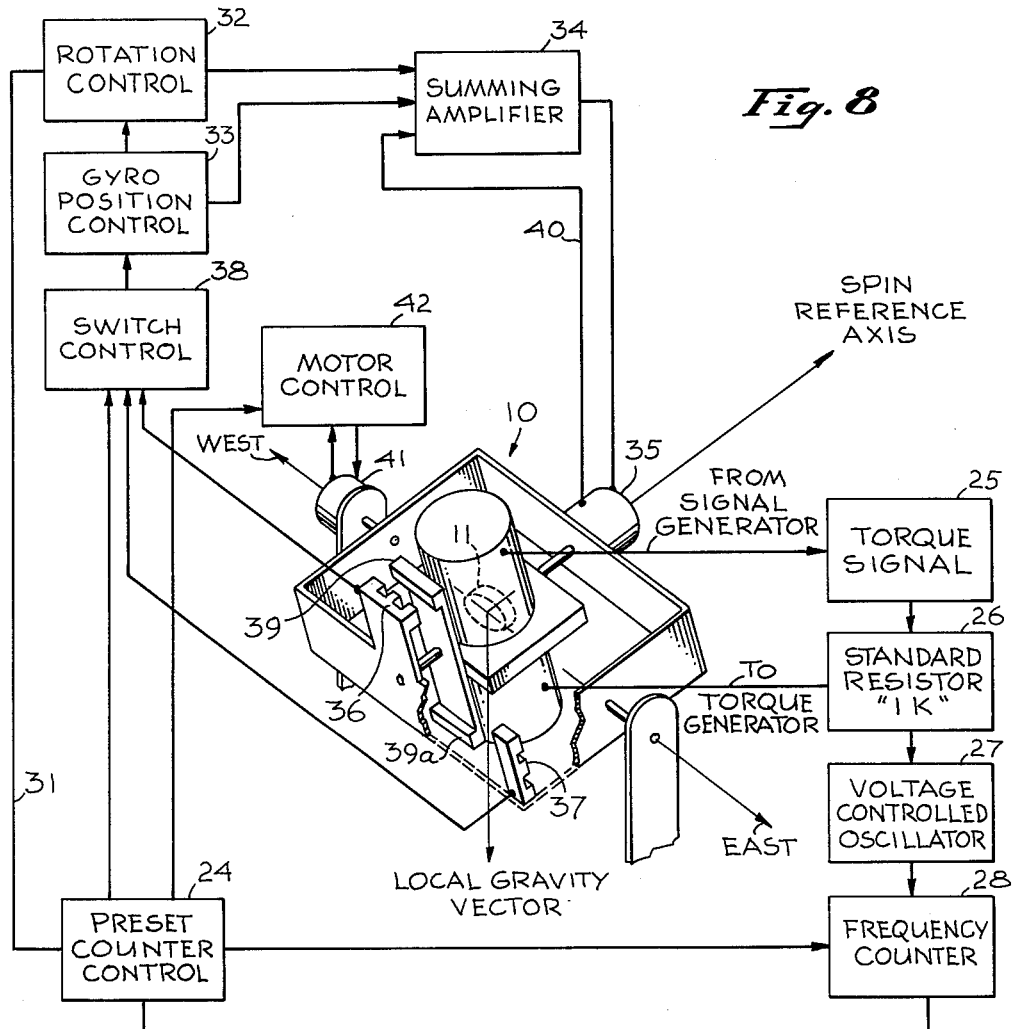
*Fig. 8*
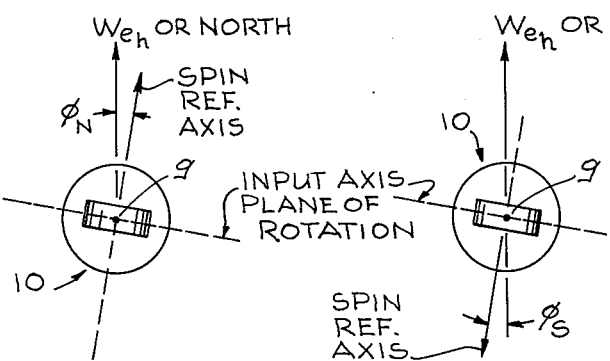
*Fig. 6*  *Fig. 7*
ROBERT L. GATES
*INVENTOR.*
BY
AGENTS

3,225,452
MEANS AND METHOD FOR GYROCOMPASS ALIGNMENT

Robert L. Gates, Palos Verdes Estates, Calif., assignor, by mesne assignments, to Thompson Ramo Wooldridge Inc., Cleveland, Ohio, a corporation of Ohio
Filed Apr. 30, 1962, Ser. No. 191,171
17 Claims. (Cl. 33—226)

This invention relates generally to a gyro compass application and, more specifically, to a system and method of gyrocompassing for determining an accurate azimuth alignment about the local gravity vector without requiring star sighting or bench marks. This invention is an improvement over my copending patent application entitled, "Gyro Compass," filed March 28, 1962, Serial No. 183,139 and assigned to the same common assignee.

Devices of this caliber have applications in systems requiring the azimuth to be accurately located without utilizing external means and in as short a time as possible. These applications vary from surveying in underground mines to the initial alignment of inertial guidance navigational equipment in either aircraft or missiles. It is well known that inertial navigation is an advanced form of dead reckoning in which the position, velocity, time and orientation of the object such as a missile must be known at the start of a flight and that all velocity and position determinations be made solely within the missile. The basic principle of inertial guidance is relatively simple in that the missle acceleration relative to a known reference frame is etablished from an initial orientation and that velocity and position information is obtained by integrating the measured acceleration. This invention is concerned primarily with the means for obtaining the initial orientation and local reference plane with respect to the local azimuth and thereby provide the basis for determining the initial conditions upon which the inertial guidance equipment is to operate. The accuracy of the initial conditions becomes extremely important on long flights.

The prior art of obtaining increased accuracy from gyro-compasses has been characterized by the use of special gyro designs involving highly mechanized, ultra precision techniques. The accuracy is directly dependent on the magnitude of the gyro random drift rate and the gyro performance stability after calibration. These devices have produced results when measured at specific latitudes, for example, Los Angeles, that range from about 30 to 120 arc seconds for these gyros. A gyro drift rate of 0.002 degree per hour yields a 32 arc second azimuth uncertainty; whereas, a drift rate of 0.0075 degree per hour will yield 120 arc seconds azimuth uncertainty.

In this invention a gyrocompass system is disclosed that has successfully attained accuracies within 16 seconds, which is equivalent to a gyro having a drift rate that is 0.001 degree per hour, while using a standard gyro having a 0.03 degree per hour short term random drift rate. The improved accuracy claimed for this invention is achieved by utilizing a good quality inertial gyro in which the spin axis, output axis and input axis are at right angles to each other. In the preferred embodiment, a single degree of freedom inertial gyro of the type designed and developed by Charles S. Draper is used. Gyros of this type are now currently being manufactured by the Reeves Instrument Corporation, Minneapolis-Honeywell, and many others. The attitude of the gyro is determined by first locating the local gravity vector. The output axis of the gyro is positioned in a local horizontal plane located at right angles to the local gravity vector. The local gravity vector is located for any specific point on the earth surface by conventional means such as a weighted pendulum. The local horizontal plane is defined as being perpendicular to the local gravity vector and is usually determined by a plurality of levelling bubbles set at right angles to each other. In accordance with present day terminology, the spin axis refers to the rotating gyro wheel, and the spin reference axis refers to the normally coincident reference axis of the gyro compass. The local gravity vector and the spin reference axis therefore define a first plane which is roughly aligned with the local meridian plane. The spin reference axis may be positioned approximately parallel to the earth's rotational axis by moving the spin reference axis an amount equal to the local meridian angle or may be positioned in the local horizontal plane. The term local defines the same point on the face of the earth or any other planet in this solar system. The input axis is located in the local horizontal plane, and the total gyro drift rate is measured and preferably recorded. The input axis is relocated in a second position in said local horizontal plane, which by definition will be substantially 180 degrees from the first position. In the preferred embodiment this is accomplished by rotating the gyro case 180 degrees about the spin reference axis and in the same direction the gyro wheel is rotating. The drift rate of the gyro in this new position is measured and again preferably recorded. The algebraic difference between the two values of drift rate is used to compute a first misalignment angle of the defined first plane from the local meridian plane. The accuracy of the misalignment determination is improved by repeating the procedure N times over an optimum operation period by a factor of $$\frac{1}{\sqrt{2N-1}}$$

The second mode of operation is begun by repositioning the gyro case so that the spin reference axis is antiparallel to the original position as set forth in the first mode. In other words, if the gyro spin reference axis was originally pointing in a northerly direction, it will be relocated substantially 180 degrees from the northerly direction. In repositioning the gyro it is preferable to rotate the gyro case about the output axis by first rotating the gyro case 90 degrees about the spin reference axis in the direction of rotation of the gyro wheel to locate the output axis in the local horizontal plane, and then rotating the gyro case about the output axis until the spin reference axis is in the defined antiparallel position. At this point the gyro case is again rotated 90 degrees about the spin reference axis in the direction of rotation of the gyro wheel to thereby place the input axis in the local horizontal plane. If the spin reference axis is in the local horizontal plane, then the local gravity vector and the output axis will coincide, making it a simple matter to rotate the gyro case 180 degrees about the output axis. By rotating the gyro case about the output axis it becomes possible to reposition the gyro at a relatively fast rate without generating unbalancing forces within the gyro. With the spin reference axis in the antiparallel position, the input axis is again located in the first position in the local horizontal plane and the total gyro drift rate measured and preferably recorded. The input axis is relocated in a second position in said local horizontal plane substantially 180 degrees from said first position. The drift rate of the gyro is measured and preferably recorded. The algebraic difference between the two values of drift rate is used to compute a second misalignment angle. The rotation cycle of the second mode is repeated at an operation period as described for the first mode.

Upon completion of the second mode, the first error angle obtained in the first mode and the second error angle obtained in the second mode are algebraically averaged to determine a final misalignment angle. The improvements claimed for this invention are believed to result from the cancellation of bias and/or azimuth errors, which are proportional to the power required by the gyro wheel. The system described herein completely cancels this bias error power drift rate.

Further objects and advantages of the present invention will be made more apparent by referring now to the accompanying drawings wherein:

FIGURE 1 is a schematic drawing of a single degree of freedom hermetic integrating gyro;

FIGURE 2 illustrates the first mode of operation with the input axis of the gyro in the local horizontal plane and facing west;

FIGURE 3 illustrates the first mode of operation with the input axis of the gyro in the local horizontal plane and facing east;

FIGURE 4 illustrates the second mode of operation with the spin reference axis antiparallel and the input axis facing west;

FIGURE 5 illustrates the second mode of operation with the spin reference axis antiparallel and the input axis facing east;

FIGURE 6 is a vector diagram illustrating the misalignment or first error angle generated by the first mode of operation;

FIGURE 7 is a vector diagram illustrating the misalignment or second error angle generated by the second mode of operation; and FIGURE 8 is a block diagram illustrating a system for automatically cycling the gyro through the first mode and the second mode.

Referring now to FIGURE 1, there is shown a single degree of freedom gyro 10, known also as an HIG gyro, for hermetic integrating gyro. Different commercial versions of the HIG gyro are available and may be used in the practice of this invention. It is realized that different gyros will differ in mechanical details; however, all such gyros will consist of a spinning gyro wheel 11 driven by an electric motor 12. The electric motor 12 is preferably mounted on pre-loaded bearings and is contained in a hermetically sealed float 13. The float 13 is supported by means of a shaft 14 that extends on each side of the float into an outside case 15 that completely encloses the gyro and float. The alignment of shaft 14 with the gyro wheel 11 is such that the shaft also represents the output axis of the gyro. The float 13 is completely submerged in a viscous material having the same average density as the float and shaft 14. In this manner the float 13 has restrained buoyancy, and no radial forces are carried on the pivots located at either end of the shaft 14. Coaxial with the shaft 14 and located within the case 15 is a signal generator 16, arranged to generate a voltage proportional to the angular displacement of the float 13 with respect to the external case 15. A torque generator 17 is also located within the case 15 and coaxial with the shaft 14. The torque generator is arranged to receive electrical signals for applying a torque to the float 13 in response to a detected output from the signal generator 16.

The operation of the gyro can best be explained by referring to the three axes about which the gyro operates. For example, the spin axis lies along the angular momentum vector of the gyro wheel 11 when the output of the signal generator 16 is zero. The output axis is coaxial with the shaft 14 and is normal to the spin axis. The float 13 is free to turn about the output axis. The input axis is normal to the output axis and the spin axis as indicated. The spin axis in the null output position will intersect the case 15 and coincide with an axis fixed in the case known as the spin reference axis of the gyro. In operation, an output is indicated as a movement of the float 13 relative to the case 15, thereby resulting in a voltage from the signal generator 16. This operation is explained by the fact that whenever a torque is applied to a spinning wheel so as to change the direction of the spin axis, the spin axis will tend to align itself with the torque vector. In the HIG gyro 10, movement of the case 15 about the input axis causes a forced precession of the gyro wheel 11 about the output axis. The gyro wheel 11 thus exerts a torque on the float 13 about the output axis, which is counterbalanced by a current passed through the torque generator 17. Whenever the gyro is electrically caged at null, angular rates (such as a component of earth rate) may be measured electrically by observing the magnitude of current in the torque generator required to keep the gyro float at electrical null. Electrical null is defined as the coincidence of the gyro wheel spin axis and gyro spin reference axis.

Torques other than the gyroscopic element, viscous drag and float inertial torques can act about the output axis. They may arise from two sources, intentionally applied through the torque generator and unintentionally applied by various disturbances. These torques result in output signals which are indistinguishable from those caused by input angular rates. These other forces therefore act to change the reference orientation of the gyro at a rate proportional to the torque. If the torques are caused by such things as float unbalance, signal generator reaction, fluid convection currents, etc., the resulting output signal looks like an input angular rate which is called the drift rate of the gyro. This drift rate is the best performance figure of merit for inertial navigational use. The lower the drift rate, the better the attitude reference is maintained, and the more accurate the guidance system.

The first mode of operation will now be explained in connection with the first embodiment by referring to FIGURE 2, where there is shown an HIG gyro 10 mounted on a suitable cradle 20 for positioning the spin reference axis of the gyro 10 parallel to the spin axis of the earth. Expressed in another way, the spin reference axis of the gyro is elevated at the local latitude angle identified by angle $\beta$. The gyro 10 is electrically caged at a null in this position. Cradle 20 is mechanized with a precision bearing 21 and 21a for allowing a suitable rotating device such as a handle 22 and 22a to rotate the gyro case 15 about the spin reference axis of the gyro 10 and to reposition the spin reference axis 180 degrees respectively. In operation, the gyro 10 is initially positioned and electrically caged at null with the spin reference axis substantially parallel to the rotational axis of the earth, and the input axis in the local horizontal plane and facing either east or west. In FIGURE 2 the input axis is assumed to be west and facing into the paper. In this configuration a current is passed through the torque generator 17 in order to electrically null any output from the signal generator 16 in order to align the spin axis of the gyro wheel 11 with the spin reference axis of the gyro. In the preferred embodiment this torque current is measured and recorded using digital techniques. Referring now to FIGURE 3, the gyro 10 is rotated 180 degrees about the spin reference axis by means of the handle 22, to thereby place the input axis again in the local horizontal plane but now in a second position facing east. In this configuration the input axis will be pointing normal to the paper facing the reader. A torque current is then sent through the torque generator 17 to null the output from the signal generator 15. This torque current is again measured and recorded, as mentioned above. This reversing or cycling operation is repeated continuously and unidirectionally, as determined by the accuracy desired and the time available. It should be pointed out, however, that the torque current is not measured while the gyro is being rotated about its spin axis. The measured torque current is used as a measure of the gyro drift rate by utilizing a scale factor associated with each gyro.

Referring now to FIGURE 6, there is shown an angle $\phi_N$, located between a plane defined by the local gravity vector $g$ (shown into the paper), the spin reference axis, and the local meridian plane. The angle $\phi_N$ is the first error angle (spin reference axis pointing north) and is more properly termed a misalignment or error angle and may be calculated by algebraically differencing the gyro drift rates obtained with the input axis in the east and west positions and solving the following equation:

$$\phi_N = \frac{\omega_{T_E} - \omega_{T_W}}{2\omega_e \cos \beta} \qquad (1)$$

where:

$\phi_N$=angle between spin reference axis and meridian plane (spin reference axis pointing north) in radians,
$\omega_{T_{E(W)}}$=total gyro drift rate with the input axis east (west) (°/hr.),
$\omega_e$=earth rate (15°/hr.),
$\beta$=latitude angle The differencing operation rejects any gyro drift rate changes with a period longer than that of the time between 180 degree rotations which in the preferred embodiment was between 2 and 5 minutes. As a result, the system is self-calibrating during operation, and the usual day-to-day and hour-to-hour drift rate changes were automatically compensated for.

Referring now to FIGURE 4, there is shown the second mode of operation with the gyro 10 being repositioned, for example, by means of handle 22a, to thereby place the spin reference axis antiparallel to the original position defined for the first mode of operation. The spin reference axis is now located 180 degrees from its original position having been relocated in the first plane originally defined by the local gravity vector and the original position of the spin reference axis. The input axis is again located in the local horizontal plane, and the drift rate measured as described for the first mode of operation.

FIGURE 5 illustrates the input axis having been rotated about the spin reference axis by means of handle 22 to a second position in the local horizontal plane facing east. The drift rate is measured and recorded preferably in the same manner as described in connection with the first mode of operation.

Referring now to FIGURE 7, there is shown an angle $\phi_S$, located between a plane defined by the local gravity vector $g$ (shown into the paper) and the spin reference axis and the local meridian plane. The angle $\phi_S$ is the second error angle and corresponds to $\phi_N$ described in connection with the first mode of operation. The value of $\phi_S$ is calculated by substituting in Equation 1 the drift rates obtained for the east and west positions of the second mode. The computed values of $\phi_N$ and $\phi_S$ are summed and averaged to thereby determine a final bias-free north determining angle.

Referring now to FIGURE 8, there is shown a preferred mechanization of the necessary servo loops for automatically controlling the HIG gyro 10. The system is comprised of two basic servo loops, the first loop being used to measure the torque current necessary to align the spin axis with the spin reference axis and the second loop being used to control the rotation of the gyro 10 about the spin reference axis in accordance with the principles of this invention. A preset counter control 24 is used to sequence and time each operation. In one embodiment a time of 100 seconds each was allowed for obtaining readings with the input axis pointing west and east. An additional 25 seconds was allowed for rotating the case about the spin reference axis from west to east. The total time for a first mode operation was, therefore, programmed for 225 seconds to receive east and west information. Since all subsequent runs require only an additional input from either east or west, the time needed for each additional run would be 125 seconds.

In accordance with the principles of this invention the HIG gyro 10 is positioned in such a manner that the spin reference axis, together with the local gravity vector, defines a first plane. The local gravity vector may be obtained by means of a pendulum commonly used in the surveying art. A local horizontal plane perpendicular to the local gravity vector is then considered to be the horizontal plane at that point on the periphery of the earth. The spin reference axis is initially elevated to the local latitude angle $\beta$ with respect to the local horizontal plane. The initial conditions are satisfied after the defined first plane is approximately aligned with the local meridian plane and the gyro electrically caged. The input axis may be initially aligned in either the east or west direction. With the input axis initially aligned, for example, pointing west, the misalignment of the rotating gyro wheel is detected by a signal from the signal generator, which results in a torque current being fed to the torque generator, to thereby align the spin axis with the spin reference axis. The average value of torque current is measured over a given period of time as a measure of the gyro drift rate. With the input axis pointing east, the torque current is again measured over the same given time interval. During the reading operation a signal from the signal generator is fed to torque signal generator 25, which feeds the torque coil in the gyro 10. The torque current is passed through a standard resistor 26, for example, 1,000 ohms, to thereby convert the torque current to a voltage. The varying voltage developed across the standard resistor 26 is detected by a voltage controlled oscillator 27, which converts the voltage to a frequency. The frequency generated by the voltage controlled oscillator 27 is accurately measured by means of a frequency counter 28 that is gated on by the preset counter control 24. After the frequency counter 28 has been on for 100 seconds it is disabled by the preset counter 24 and prevented from recording additional information. The output of the counter frequency 28 is fed into a computer 29, also gated by the preset counter control 24, that accepts the summations of counts for each run and divides the total by the number of runs for both east and west readings. Each of these average readings may be algebraically differenced, averaged, and the result multiplied by a gyro scale factor in that order, or each average reading may be multiplied by the gyro scale factor, algebraically differenced, and then averaged. The results in either case will produce a first error angle that will be held in the computer until after the second mode of operation when a second error angle will be produced. The computer 29, under control of the preset counter control 24, will sum and average the results of the first and second error angles and feed the final computed error angle to a utilization device 30 that can be either a guidance system or simply a printed readout of angle error.

A signal from the preset counter 24 is sent along line 31 to a rotation control 32 and a gyro position control 33. The rotation control 32 energizes a summing amplifier 34, which is connected to a suitable motor 35 for rotating the gyro 10 about its spin reference axis at a preferably constant speed. The gyro position control 33 is connected in circuit with either positioning device 36 or 37, as determined by a switch control 38, impulsed by the present counter control 24. The positioning device 36 and 37 may be, for example, an E pick-off which is arranged to accurately locate a suitable iron slug 39, which rotates on the same base as the gyro 10. In the first mode, switch control 38 feeds the output of positioning device 36 into the gyro position control 33. A second slug 39a is located 180 degrees from the first slug 37 to position the gyro 10 in the second position. A tachometer output from the motor 35 is fed along line 40 back into the summing amplifier 34, as a feed back means for controlling the speed of the motor 35. The gyro 10 is rotated by the motor 35 until the iron slug 37a approaches the E pick-off 36, at which point the voltage signal is induced in the E pick-off and fed into the gyro position control 33, since the output from E pick-off 37 is open and not used. The signal from E pick-off 36 causes the gyro position control 33 to feed a disabling signal into the rotation control 32. The gyro position control 33 receives a continuing signal from the E pick-off 36 for accomplishing the final positioning of the slug 39a.

In the embodiment of the first mode just described, the rotation of the gyro 10 takes approximately 4 seconds, and the preset counter control 24 is adjusted to allow approximately 25 seconds for the rotation, locking and settling of transients caused by the rotation of the gyro 10. After the 25 seconds have elapsed, the preset counter 24 gates the counter 28 into an On condition for exactly 100 seconds while the drift rate is recorded with the input axis facing east. The first complete reading of a west and east operation is preset to take exactly 225 seconds, which allows 100 seconds for each reading and 25 seconds for rotating the gyro 10. By increasing the number of readings in the east and west direction and thereby obtaining additional error angles, it will be appreciated that the total accuracy of the system may be increased.

In order to prepare the gyro 10 for the second mode of operation, it is necessary to reposition the spin reference axis substantially 180 degrees from its original position. The repositioning of the spin reference axis may be accomplished in a variety of manners that will be apparent to those skilled in the art. Due to the geometries involved and the desire for a short repositioning time, it was found most preferable to first rotate the gyro 90 degrees about the spin reference axis, to thereby place the output axis in the local horizontal plane in the east-west line, then rotate the gyro at 180 degrees about the output axis to reposition the spin reference axis and then rotate the gyro 90 or 180 degrees about the spin reference axis, to again locate the input axis in the local horizontal plane facing either east or west. The preset counter control 24 controls this operation by impulsing the switch control 38 for selecting and feeding the output from the E pick-off 37 to the gyro position control 33. At the same time, the preset counter control 24 controls the rotation control 32 in the manner previously described to thereby energize motor 35. The gyro 10 will rotate until either iron slug 39 or 39a is positioned before the E pick-off 37 and the rotation of motor 35 stopped. With the gyro rotated 90 degrees about the spin reference axis, the output axis of the gyro will be located in the local horizontal plane facing either east or west. A reversible motor 41 connected in circuit with a motor control 42 and impulsed by the preset counter control 24 will rotate the gyro about the output axis substantially 180 degrees from its original position. The motor 41 and motor control 42 may include conventional selsyn motor, resolver and repeating mechanism for effecting the 180 degrees rotation.

In order to realign the output axis in the same relative position as in the first mode, the gyro must be rotated 90 degrees about the spin reference axis, which also places the input axis of the gyro in the east-west axis. This is accomplished by the preset counter control 24 impulsing the rotation control 32 for controlling the rotation of motor 35 and simultaneously impulsing the switch control 38 to feed the output of the E pick-off 36 into gyro position control 33. The motor 35 will rotate 90 degrees until either iron slug 39 or 39a is opposite the E pick-off 36, which again places the input axis in the local horizontal plane facing either east or west. The gyro drift rates for the second mode of operation is measured in the same manner as described for the first mode of operation, that is, the gyro drift rate is measured with the input axis facing east and again measured with the input axis facing west. The computer 29 then computes the second error angle and finally sums and averages the first and second error angles to determine a final error angle which is fed to the utilization device 30.

The second embodiment of this invention is achieved by simply locating the spin reference axis, in the local horizontal plane. Due to the cancellation of errors it was discovered that the attitude of the spin reference axis is not critical. In fact, the actual angle of the spin reference axis with respect to the local horizontal plane can be arbitrarily selected. It is essential, however, that the second position of the spin reference axis be positioned approximately 180 degrees from the first position in the defined first plane before determining the second error angle, as previously described, in order to place the spin reference axis in the defined first plane. For convenience of operation in relocating the spin reference axis, the spin reference axis is initially located in the local horizontal plane which makes the output axis coincide with the local gravity vector. In this configuration the first error angle is determined by measuring the gyro drift rates with the input axis first in the east direction and then in the west direction, as previously described. The second mode of operation requires the placing of the spin reference axis 180 degrees from the original or first position. This may be achieved by simply rotating the gyro case 180 degrees about the output axis; or in the alternative, the gyro may be rotated 90 degrees about the spin reference axis and the gyro reoriented, as described in connection with the first embodiment. The second error angle is determined and a final error angle determined by averaging the first and second error angles, as previously described. The system illustrated in FIGURE 8 may be used for either embodiment, depending only on the programming of the preset counter control 24.

The improvements claimed for the present invention result from the algebraic cancellation of gyro drift coefficients. The following analysis for the second embodiment illustrates the cancellation of the bias producing power term with the spin reference axis in the local horizontal plane.

By differencing the rates measured with the input axis east and then west, the first mode of operation results in the following equation:

$$(\omega_W - \omega_E) = 2\omega_{e_h}\phi_N - 2P \qquad (3)$$

where:

$\omega_W$ = total gyro rate measured with the input axis pointed west.

$\omega_E$ = total gyro rate measured with the input axis pointed east.

$\omega_{e_h}$ = horizontal earth rate (approximately 12.5°/hour at 34 degrees latitude).

$\phi_N$ = angle between the gyro spin axis and the meridian plane (north).

$P$ = drift rate proportional to spin motor input power and acceleration along the output axis (result of turbine torque caused by convection currents along the output axis).

the second mode of operation results in the following equation:

$$(\omega'_W - \omega'_E) = 2\omega_{e_h}\phi_S + 2P \qquad (4)$$

Summing Equations 3 and 4 and solving for $\phi_N + \phi_S$, $$\phi_N + \phi_S = \frac{(\omega_W - \omega_E) + (\omega'_W - \omega'_E)}{2\omega_{e_h}} \qquad (5)$$

Since $\phi_N = \phi_S$ and solving for $\phi$, it can be shown that by simple algebraic summations the power error term is cancelled out. The reference copending application presents a more thorough analysis leading up to Equation 3.

$$\phi = \frac{(\omega_W - \omega_E) + (\omega'_W - \omega'_E)}{4\omega_{e_h}} \text{ (rad)} \qquad (6)$$

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
an inertial gyro having a spin reference axis, an input axis, and an output axis at right angles to each other, said spin reference axis and a local gravity vector defining a first plane adapted to be placed in approximate coincidence with the local meridian plane,
means for locating said input axis in a first position in a local horizontal plane perpendicular to said local gravity vector,
means for locating said input axis in a second position in said local horizontal plane,
means for measuring the total gyro drift rate with said input axis in said first position and in said second position,
means responsive to said gyro drift rate in said first position and said second position for determining a first misalignment angle of said first plane with respect to said local meridian plane,
repositioning means for positioning said spin reference axis 180 degrees from its original position in said first plane,
means for thereafter locating said input axis in a first position in said local horizontal plane,
means for measuring the total gyro drift rate with said input axis in said last named first position,
means for thereafter locating said input axis in a second position in said local horizontal plane,
means for measuring the total gyro drift rate with said input axis in said last named second position,
means responsive to said gyro drift rate determined in said last named first position and said last named second position for determining a second misalignment angle of said first plane with respect to said local meridian plane, and
means for averaging said first and second misalignment angles to determine a final misalignment angle of said first plane with respect to said local meridian plane.

2. A combination according to claim 1 in which said repositioning means rotates said gyro substantially 180 degrees about said output axis for relocating said spin reference axis 180 degrees from said original position.

3. A combination according to claim 2, said repositioning means comprising means for rotating said gyro substantially 90 degrees about said spin reference axis, and means for rotating said gyro substantially 180 degrees about said output axis.

4. In combination,
an inertial gyro comprising a rotating gyro wheel having a spin reference axis, an input axis and an output axis at right angles to each other, said spin reference axis and a local gravity vector defining a first plane adapted to be placed in approximate coincidence with the local meridian plane,
means for rotating said input axis about said spin reference axis in the direction of rotation of said gyro wheel to an easterly direction in a location horizontal plane perpendicular to said local gravity vector,
means for measuring the total gyro drift rate with said input axis pointing east,
means for rotating said input axis about said spin reference axis in the direction of spin of said gyro wheel substantially 180 degrees to a westerly direction,
means for measuring the total gyro drift rate of said gyro with said input axis pointing west,
means for algebraically differencing said gyro drift rates determined with said input axis pointing east and west to determine a first misalignment angle of said first plane with respect to said local meridian plane,
repositioning means for rotating said gyro substantially 180 degrees about said output axis whereby said spin reference axis is relocated 180 degrees from said original position in said first plane,
means for thereafter rotating said input axis about said spin reference axis in the direction of spin of said gyro wheel to an easterly direction in said local horizontal plane,
means for thereafter measuring the total gyro drift rate with said input axis pointing east,
means for thereafter rotating said input axis about said spin reference axis in the direction of spin of said gyro wheel substantially 180 degrees to a westerly direction,
means for thereafter measuring the total gyro drift rate of said gyro with said input axis pointing west,
means for algebraically differencing said gyro drift rates determined from said easterly and westerly directions for determining a second misalignment angle of said first plane with respect to said local meridian plane, and
means for averaging said first and second misalignment angles to determine a final misalignment angle of said first plane with respect to said local meridian plane.

5. A combination according to claim 1 which includes gimbal means for maintaining the spin reference axis of said inertial gyro at the local latitude angle with respect to said local horizontal plane.

6. A combination according to claim 5, said repositioning means comprising means for rotating said gyro substantially 90 degrees about said spin reference axis, and means for rotating said gyro substantially 180 degrees about said output axis.

7. In combination,
an inertial gyro comprising a rotating gyro wheel, a signal generator and a torque generator, said inertial gyro having a spin reference axis and an input axis at right angles to each other, said spin reference axis and a local gravity vector defining a first plane adapted to be placed in approximate coincidence with the local meridian plane,
means for locating said input axis in a first position in a local horizontal plane perpendicular to said local gravity vector,
means responsive to a signal from said signal generator for generating and feeding a current signal through said torque generator, said torque generator exerting a torque on said rotating gyro wheel for aligning the spin axis of the gyro wheel with said spin reference axis of said gyro,
means for locating said input axis in a second position in said local horizontal plane,
means for measuring the total gyro drift rate of said gyro wheel with said input axis in said first position and in said second position,
means responsive to said gyro drift rate measured in said first position and said second position for determining a first misalignment angle of said first plane with respect to said local meridian plane,
repositioning means for positioning said spin reference axis 180 degrees from said original position in said first plane,
means for locating said input axis in a first position in said local horizontal plane with said spin reference axis repositioned,
means responsive to a signal from said signal generator for generating and feeding a current signal through said torque generator with said spin reference axis repositioned,
means for measuring said last named current signal over a given period of time as a measure of the total gyro drift rate of said rotating gyro wheel,
means for locating said input axis in a second position in said local horizontal plane with said spin reference axis repositioned, means for measuring the total gyro drift rate of said gyro with said input axis in said second position and said spin reference axis repositioned, means responsive to said gyro drift rate with said spin axis repositioned and in said first position and said second position of said input axis for determining a second misalignment angle of said first plane with respect to said local meridian plane, and means for averaging said first and second misalignment angles to determine final misalignment angle of said first plane with respect to said local meridian plane.

8. A combination according to claim 7 which includes gimbal means for maintaining the spin reference axis of said inertial gyro aligned in said first plane at the local latitude angle with respect to said local horizontal plane.

9. A combination according to claim 7 in which said locating means comprises means for rotating said gyro about said spin reference axis in the direction of spin of said rotating gyro wheel.

10. A combination according to claim 7 in which said repositioning means comprising means for rotating said spin reference axis substantially 180 degrees about said output axis.

11. A combination according to claim 7, said repositioning means comprising means for rotating said gyro substantially 90 degrees about said spin reference axis, and means for rotating said gyro substantially 180 degrees about said output axis.

12. A method of using an inertial gyro that comprises the steps of first, approximately aligning a first plane defined by the local gravity vector and the spin reference axis with the local meridian plane, then locating the input axis of the gyro in a first position in the local horizontal plane, then measuring the total gyro drift rate with the input axis in said first position, then locating said input axis in a second position in said local horizontal plane, then measuring the total gyro drift rate with said input axis in said second position, then algebraically differencing the gyro drift rate measured in said first position and said second position to determine a first misalignment angle of said first plane with respect to said local meridian plane, then repositioning said spin reference axis 180 degrees from the original position in said first plane, then locating the input axis of the gyro in a first position in the local horizontal plane, then measuring the total gyro drift rate with the input axis in said last named first position, then locating said input axis in a second position in said local horizontal plane, then measuring the total gyro drift rate with said input axis in said last named second position, then algebraically differencing the gyro drift rate measured in said last named first position and said last named second position to determine the second misalignment angle of said first plane with respect to said local meridian plane, and then summing and averaging said first and second misalignment angles to determine a final misalignment angle of said first plane with respect to said local meridian plane.

13. A method according to claim 12 in which the gyro is rotated about the spin reference axis in the direction of spin of the spinning gyro wheel.

14. A method according to claim 12 which includes the step of initially positioning the spin reference axis at the local latitude angle.

15. A method according to claim 12 which includes the step of initially positioning the spin reference axis in the local horizontal plane.

16. A method according to claim 12 in which said repositioning of the spin reference axis comprises rotating the gyro about the output axis.

17. A method according to claim 16 in which said repositioning of the spin reference axis comprises first rotating the gyro 90 degrees about the spin reference axis, thereby placing the output axis in the local horizontal plane, then rotating the gyro 180 degrees about the output axis, and then rotating the gyro an odd multiple of 90 degrees about the spin reference axis.

References Cited by the Examiner

UNITED STATES PATENTS

| | | | |
|---|---|---|---|
| 2,972,195 | 2/1961 | Campbell et al. | 33—226 |
| 2,988,818 | 6/1961 | Madden et al. | 33—204 |

ROBERT B. HULL, *Primary Examiner.*